United States Patent
Korn et al.

(10) Patent No.: US 8,490,956 B2
(45) Date of Patent: Jul. 23, 2013

(54) FIXTURE FOR COMPRESSOR STATOR CHORD RESTORATION REPAIR

(75) Inventors: Nathan D. Korn, Singapore (SG); Mohamed Salleh Najib, Singapore (SG)

(73) Assignee: Pratt & Whitney Services PTE Ltd., Singapore (SG)

( * ) Notice: Subject to any disclaimer, the term of this patent is extended or adjusted under 35 U.S.C. 154(b) by 967 days.

(21) Appl. No.: 12/547,087

(22) Filed: Aug. 25, 2009

(65) Prior Publication Data

US 2010/0044944 A1 Feb. 25, 2010

(30) Foreign Application Priority Data

Aug. 25, 2008 (SG) .............................. 200806292-9

(51) Int. Cl.
*B23Q 3/00* (2006.01)
*B25B 1/20* (2006.01)
*B25B 27/14* (2006.01)

(52) U.S. Cl.
USPC ............... 269/287; 269/43; 269/45; 269/900; 269/309; 269/310; 29/281.1

(58) Field of Classification Search
USPC ...... 269/43, 45, 287, 309, 310, 900; 29/281.1
See application file for complete search history.

(56) References Cited

U.S. PATENT DOCUMENTS

| | | | |
|---|---|---|---|
| 2,503,630 A | 4/1950 | Norton | |
| 2,680,286 A | 6/1954 | Willgoos | |
| 2,823,727 A | 2/1958 | Goldsmith | |
| 5,055,752 A | 10/1991 | Leistensnider et al. | |
| 5,063,662 A | 11/1991 | Porter et al. | |
| 5,544,873 A | 8/1996 | Vickers et al. | |
| 6,106,204 A | 8/2000 | Dansereau et al. | |
| 6,139,412 A | 10/2000 | Dwyer | |
| 6,490,791 B1 | 12/2002 | Surace et al. | |
| 6,619,642 B2 | 9/2003 | Cannon et al. | |
| 6,627,833 B2 | 9/2003 | Varsell et al. | |
| 6,662,071 B1 | 12/2003 | Jackson et al. | |
| 6,791,054 B1 | 9/2004 | Mertz | |
| 6,792,655 B2 | 9/2004 | Wah | |
| 6,842,995 B2 | 1/2005 | Jones et al. | |
| 6,844,515 B2 | 1/2005 | Byrnes et al. | |
| 6,855,033 B2 | 2/2005 | Jones et al. | |
| 6,984,108 B2 * | 1/2006 | Anderson et al. | 415/209.3 |

(Continued)

OTHER PUBLICATIONS

Search and Examination Report from SG Application Serial No. 201201233-2, dated Mar. 7, 2013, 9 pages.

*Primary Examiner* — Monica Carter
*Assistant Examiner* — Nirvana Deonauth
(74) *Attorney, Agent, or Firm* — Kinney & Lange, P.A.

(57) ABSTRACT

A fixture assembly for retaining a workpiece during a coining process includes a mounting block. The workpiece includes an airfoil portion, a platform, and feet extending from the platform opposite the airfoil portion configured to engage a retention slot in a gas turbine engine, each foot defining a substantially arcuate engagement surface. The mounting block includes a first portion having a slot defined therein between opposite first and second lateral edges and having an exposed front face, first and second retaining structures positioned adjacent to the first and second lateral edges, respectively. Each of the first and second retaining structures overhangs the slot and defines an engagement surface facing the slot, such that during engagement of the workpiece the substantially arcuate engagement surfaces of the feet contact the engagement surfaces of the first and second retaining structures to provide a pivotable engagement.

9 Claims, 6 Drawing Sheets

U.S. PATENT DOCUMENTS

| | | |
|---|---|---|
| 7,032,279 B2 | 4/2006 | McCarvill et al. |
| 7,080,434 B2 | 7/2006 | Jones et al. |
| 2003/0068225 A1 | 4/2003 | Housley et al. |
| 2005/0091847 A1 | 5/2005 | Beneteau et al. |
| 2005/0191117 A1 | 9/2005 | Herb |
| 2007/0007260 A1 | 1/2007 | Steinhardt |
| 2007/0157447 A1 | 7/2007 | Prevey |

* cited by examiner

FIXTURE FOR COMPRESSOR STATOR CHORD RESTORATION REPAIR

BACKGROUND

The present invention relates to fixtures and methods for holding workpieces, and more particularly to fixtures and methods for holding airfoil workpieces during coining operations of a repair process.

Airfoils for gas turbine engines, such as compressor stators (or vanes), can become worn or damaged during use, particularly at leading and/or trailing edges. Replacement parts can be used to replace the damaged or worn airfoils to keep an engine in service, but replacement parts are often expensive. Repairing damaged or worn airfoils can be a more cost-effective approach.

Known repairs of airfoil edges can involve removing material at the location of wear or damage, then joining a filler material that is then machined to original blueprint dimensions. With repairs that include coining operations, filler material added to the airfoil workpiece during repair can cause coining dies to exert relatively uneven force patterns, which can produce stress and potentially deform the airfoil workpiece in an undesired manner (e.g., twisting the airfoil portion out of conformity with an original blueprint configuration or beyond engine manual serviceable limits).

SUMMARY

A fixture assembly for retaining a workpiece during a coining process includes a mounting block. The workpiece includes an airfoil portion, a platform, and feet extending from the platform opposite the airfoil portion and configured to engage a retention slot in a gas turbine engine, each foot defining a substantially arcuate engagement surface. The mounting block includes a first portion having a slot defined therein between opposite first and second lateral edges and having an exposed front face, first and second retaining structures positioned adjacent to the first and second lateral edges, respectively. Each of the first and second retaining structures overhangs the slot and defines an engagement surface facing the slot, such that during engagement of the workpiece the substantially arcuate engagement surfaces of the feet contact the engagement surfaces of the first and second retaining structures to provide a pivotable engagement.

DETAILED DESCRIPTION

In general, the exemplary embodiments provide fixture assemblies and methods for securing an airfoil workpiece during a coining (or forging or stamping) operation. The coining operation can be a part of a repair process performed on a worn or damaged airfoil. The fixture assembly and method are particularly suited to securing airfoils, such as compressor stators (or vanes), that include an airfoil portion, a platform adjacent to the airfoil portion, and feet located adjacent to the platform opposite the airfoil portion, where each of the feet defines an arcuate engagement surface. The exemplary fixture assembly provides means for retaining the airfoil workpiece during coining repair. The fixture assembly can include a biasing member, such as a spring-loaded pin, for biasing the airfoil workpiece to maintain engagement with the fixture assembly during coining, with movement or deflection of the biasing member allowing easy engagement and disengagement. This helps reduce the time and effort required to both engage and disengage the airfoil workpiece from the fixture assembly. In addition, the fixture assembly can secure the airfoil workpiece relative to a number of workpiece datums while still permitting pivotal movement of the airfoil workpiece during coining. Pivotal movement of the airfoil workpiece in the coining die can help alleviate undesired stress and deformation during the coining operation.

Figure 1:
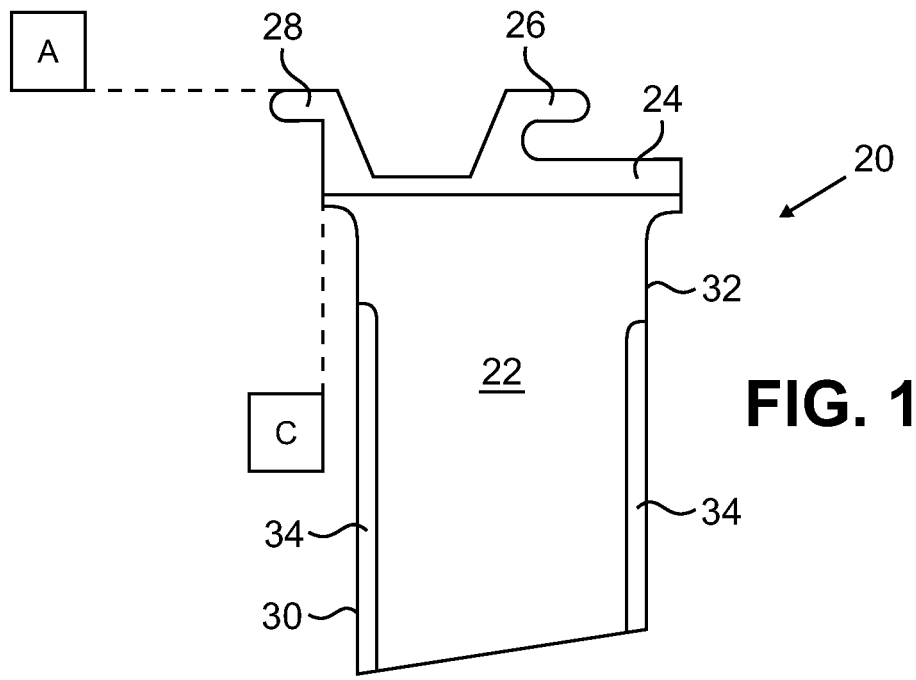
FIG. 1 is a side view of an exemplary airfoil.
Figure 2:
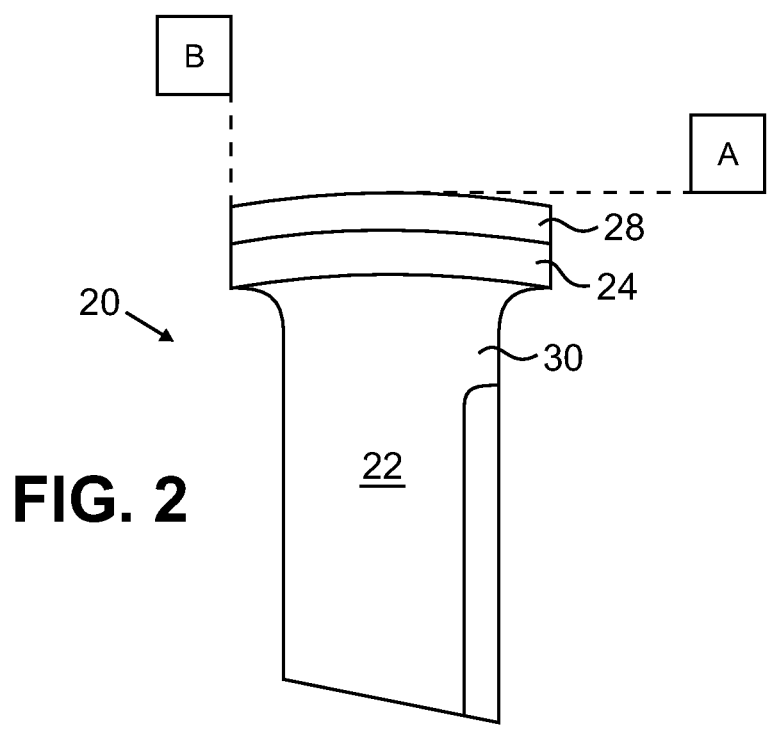
FIG. 2 is a front view of the airfoil of FIG. 1.

FIG. 1 is a side view of an exemplary airfoil 20, and FIG. 2 is a front view of the airfoil 20. In one embodiment, the airfoil 20 is a compressor stator for a gas turbine engine. As illustrated, the airfoil 20 includes an aerodynamically shaped airfoil portion 22, a platform 24 located adjacent to and joined with the airfoil portion 22, and first and second feet 26 and 28, respectively, extending from the platform 24 opposite the airfoil portion 22. The airfoil portion 22 defines a leading edge 30 and a trailing edge 32. As shown in FIGS. 1 and 2, parent material of the airfoil portion 22 of the airfoil 20 has been removed along both the leading and trailing edges 30 and 32 and replaced with a filler material 34. The filler material 34 can be utilized to replace worn or damaged regions of the airfoil 20, and can be joined to the remaining parent material through known welding or brazing techniques. The filler material 34 can have substantially the same composition as the parent material. The filler material 34 is typically applied beyond an operational condition edge location of the airfoil 20, that is, the filler material 34 is applied to a thickness greater than that of the parent material removed, thereby providing excess filler material beyond the original blueprint specifications. The excess of the filler material 34 can be provided for a subsequent coining operation, which typically reduces the amount of excess filler material beyond the original blueprint specifications.

The feet 26 and 28 are configured to engage the airfoil 20 within a gas turbine engine. In the illustrated embodiment, the feet 26 and 28 are configured to secure the airfoil 20 to a circumferential slot in the engine, with the airfoil portion 22 positioned radially inward of the feet 26 and 28. As best shown in FIG. 2, the feet 26 and 28 and the platform 24 are arcuate in shape (only foot 28 is visible in FIG. 2).

The airfoil 20 in the illustrated embodiment defines at least three datums A, B and C. Datum A is defined at a radially outer surface of the feet 26 and 28, tangent to a midpoint of that arcuate surface. Datum B is defined at a lateral surface of the platform 24 and the feet 26 and 28. Datum C is located at a forward edge of the platform 24 and an adjacent, radially-extending portion of the foot 28. The illustrated datums are provided by way of example and not limitation, and in alternative embodiments the datums A, B and C can be defined in other locations on the airfoil 20.

It should be understood that the airfoil 20 is merely an exemplary embodiment, and a variety of other airfoil configurations are possible. Also, the exemplary fixture assemblies and methods discussed below are not limited to use with airfoils having the particular configuration of the airfoil 20 as illustrated.

Figure 3:
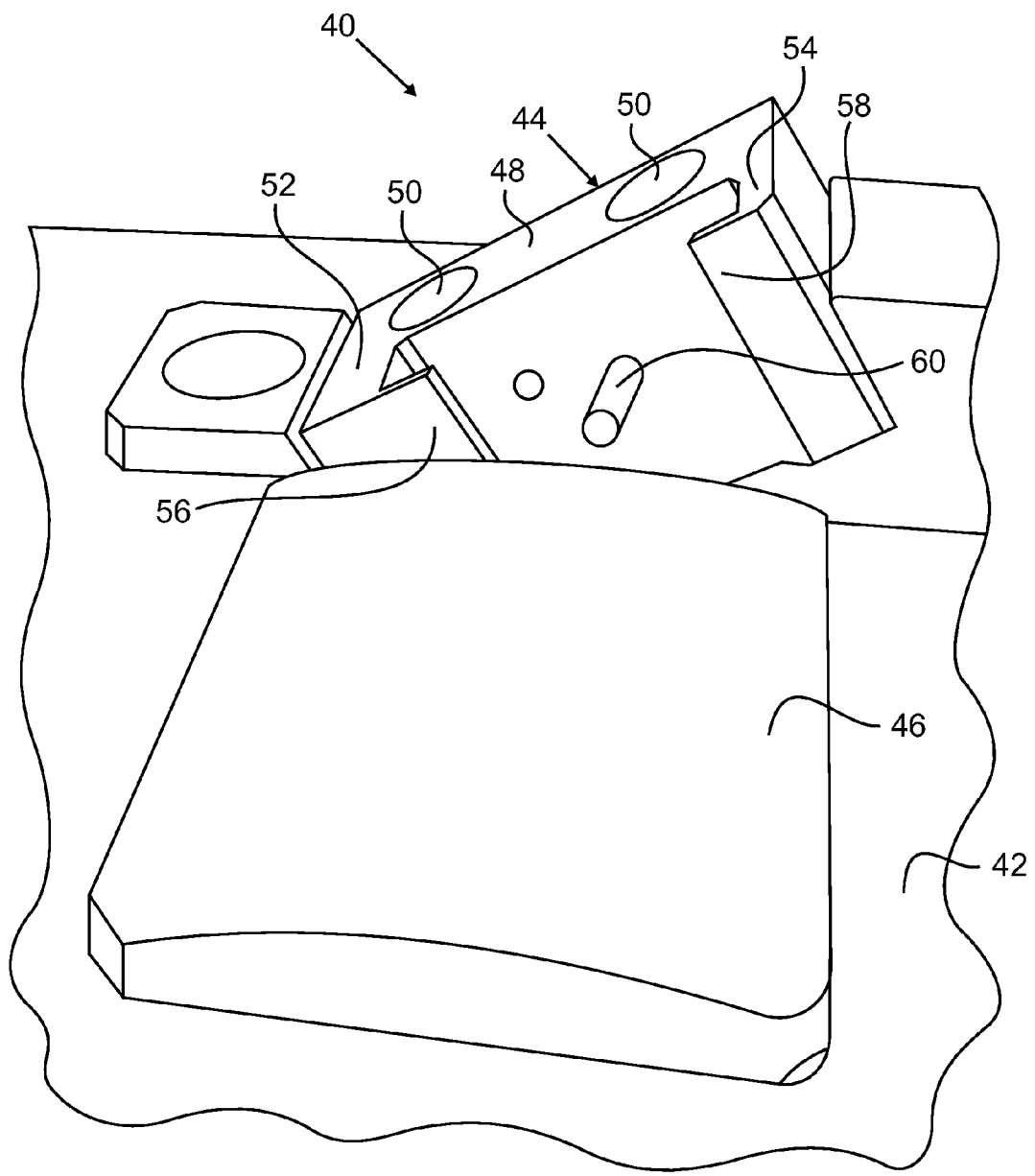
FIG. 3 is a perspective view of a first embodiment of a fixture assembly according to the present invention.

The exemplary fixture assemblies shown in FIGS. 3-8 can be used to retain the airfoil 20 during a coining repair process. FIG. 3 is a perspective view of a first embodiment of a fixture assembly 40 that includes a base 42, a mounting block 44 attached to the base 42, and a portion of a coining (or forging) die 46 attached to the base 42 adjacent to the mounting block 44.

Figure 4:
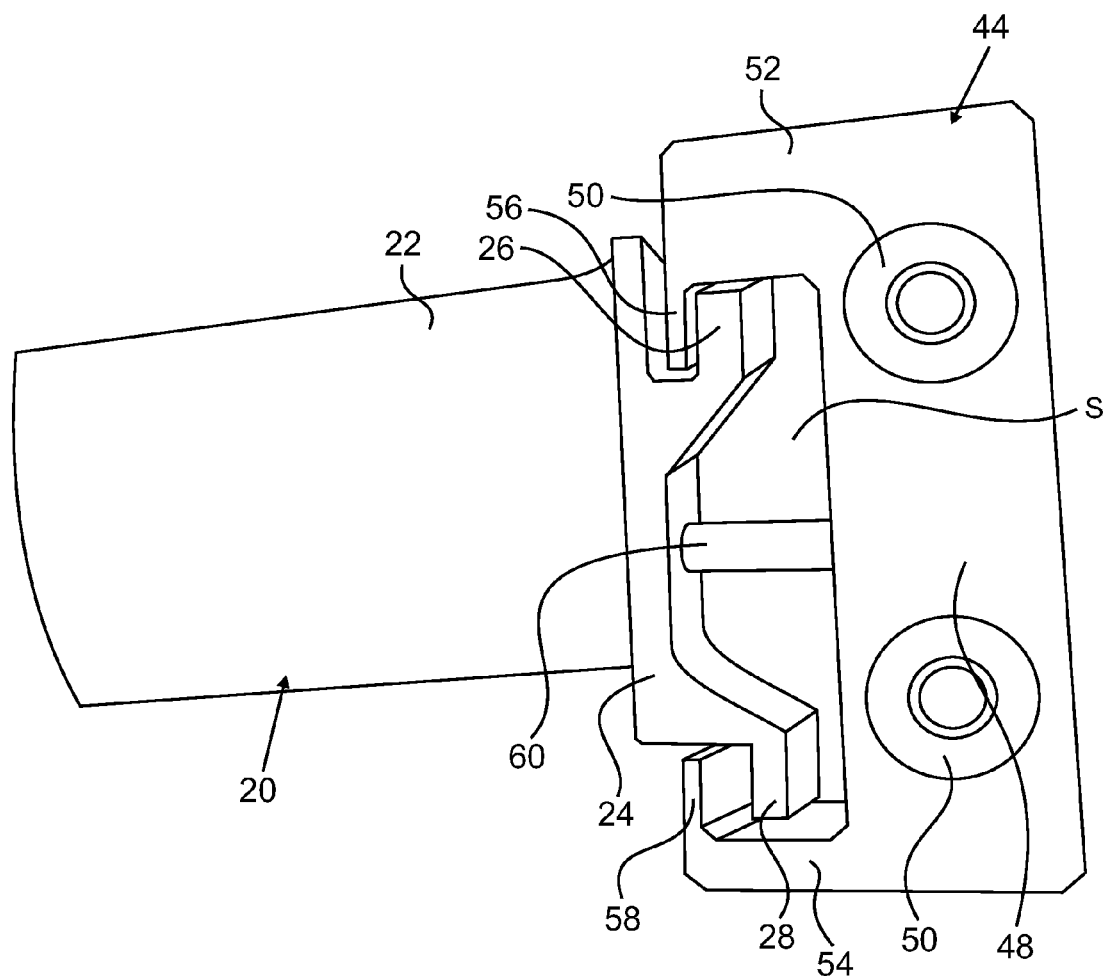
FIG. 4 is a side view of the airfoil engaged to a mounting block of the first embodiment of the fixture assembly.

FIG. 4 is a side view of the airfoil 20 engaged to the mounting block 44 of the fixture assembly 40. In FIG. 4 the mounting block 44 is shown in isolation, separate from the rest of the fixture assembly 40. The mounting block 44 includes a base portion 48 having openings 50 therein for accepting fasteners (e.g., bolts) for securing the mounting block 44 to the base 42 (see FIG. 1). First and second lateral portions 52 and 54 extend outward from the base portion 48, with a slot S defined in the mounting block 44 between the first and second lateral portions 52 and 54. The base portion 48 and the first and second lateral portions 52 and 54 of the mounting block 44 define edges of the slot S. In the illustrated embodiment, the slot S is substantially open at three faces. First and second retaining structures 56 and 58 extend from the first and second lateral portions 52 and 54, respectively. The first and second retaining structures 56 and 58 each overhang the slot S and define an engagement surface facing the slot S. In the illustrated embodiment of FIG. 4, the engagements surfaces of the first and second retaining structures 56 and 58 are each substantially planar. The engagement surfaces of the first and second retaining structures 56 and 58 can be arranged substantially parallel to each other.

A retaining pin 60 is provided that extends from the base portion 48 of the mounting block 44 into the slot S, opposite the engagement surfaces of the first and second retaining structures 56 and 58. The retaining pin 60 is substantially cylindrical in shape in the illustrated embodiment, but can have other shapes in alternative embodiments, for instance, having a rounded or pointed distal end for contacting workpieces. The retaining pin 60 can be spring-loaded, or biased with other suitable means, to provide a biasing force in a direction toward the engagements surfaces of the first and second retaining structures 56 and 58. The retaining pin 60 can contact the platform 24 to bias the airfoil 20 against the engagements surfaces of the first and second retaining structures 56 and 58, for instance, in order to maintain engagement with the fixture assembly during coining. It is possible to depress the retaining pin 60 at least partially into the base portion 48 of the mounting block 44 against the bias force with an application of a relatively light force, allowing easy engagement and disengagement of the airfoil 20 from the mounting block 44. The retaining pin 60 allows the airfoil 20 to be engaged and disengaged from the fixture assembly 40 relatively quickly, and typically much more quickly compared to known fixture assemblies that include threaded fasteners or clamping structures for holding the airfoil 20 to the fixture assembly 40. Depression of the retaining pin 60 saves time compared to torquing retaining fasteners or operating many types of clamping structures such that the fixture assembly 20 facilitates reducing the overall time and expense associated with airfoil coining repairs.

As shown in FIG. 4, the airfoil 20 is engaged with the mounting block 44 in such a way that substantially arcuate engagement surfaces of the first and second feet 26 and 28, which face the platform 24, contact the engagement surfaces of the first and second retaining structures 56 and 58, respectively, to provide a pivotable engagement. This pivotable engagement helps keep the fixture assembly 40 closely aligned relative to the datums A and C of the airfoil 20.

Figure 5:
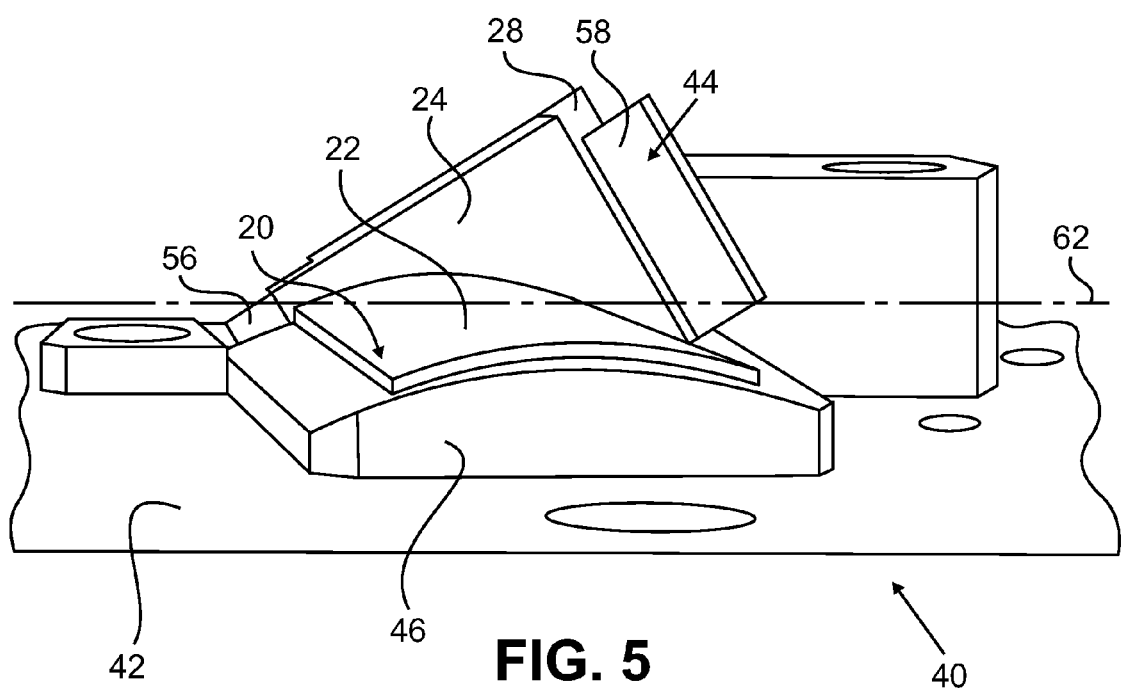
FIG. 5 is a perspective view of the airfoil engaged with the first embodiment of the fixture assembly.

FIG. 5 is a perspective view of the airfoil 20 engaged with the fixture assembly 40. In the illustrated embodiment, the airfoil portion 22 is arranged in a substantially horizontal orientation and is positioned against the portion of the coining die 46. The feet 26 and 28 are engaged to the mounting block 44, which is positioned at a non-horizontal angle with respect to the base 42. Positioning the mounting block 44 at an angle allows the airfoil portion 22 of the engaged airfoil 20 to lie substantially horizontally along the die 46. A pivot axis 62 is defined about which the airfoil 20 can pivot during a coining operation, where another die portion (not shown) comes together with the die 46 to apply force to the airfoil portion 22 located therebetween. In the illustrated embodiment, the pivot axis 62 is defined between points located generally at opposite corners of the substantially arcuate engagement surfaces of the first and second feet 26 and 28, where those first and second feet 26 and 28 contact the engagement surfaces of the first and second retaining structures 56 and 58. In this embodiment, the pivot axis 62 is arranged substantially horizontally.

With repair processes, worn or damaged areas of the airfoil portion 22 can be removed and the filler material 34 joined to the airfoil portion 22 to replace the parent material removed. Coining operations can then be performed after the filler material 34 has been added. As discussed previously in the background, coining dies can exert relatively uneven force patterns on the airfoil 20 due to the presence of the filler material 34, as well as due to bends and twists that may have undesirably developed in the airfoil 20 during use in an engine. Because coining dies can exert many tons of force on airfoils that often include relatively thin regions, coining operations can produce stress and potentially deform the airfoil 20 in an undesired manner (e.g., twisting the airfoil portion 22 out of conformity with an original blueprint configuration or beyond engine manual serviceable limits). Configuration of the fixture assembly 40 to allow pivotal movement of the airfoil 20 about the pivot axis 62 during coining operations can help alleviate such undesired stress and deformation, while still focusing force of the coining dies in a desired manner. The slot S in the mounting block 44 provides enough space for the first and second feet 26 and 28 to move freely as the airfoil 20 pivots about the pivot axis 62. Datums of the airfoil 20 can thereby remain closely aligned relative to the fixture assembly 40 to provide relatively precise and accurate coining, while still allowing pivotal movement. The biased retaining pin 60 helps the airfoil 20 remain engaged with the fixture assembly 40 during coining, but without inhibiting pivotal movement of the airfoil 20 about the pivot axis 62.

Figure 6:
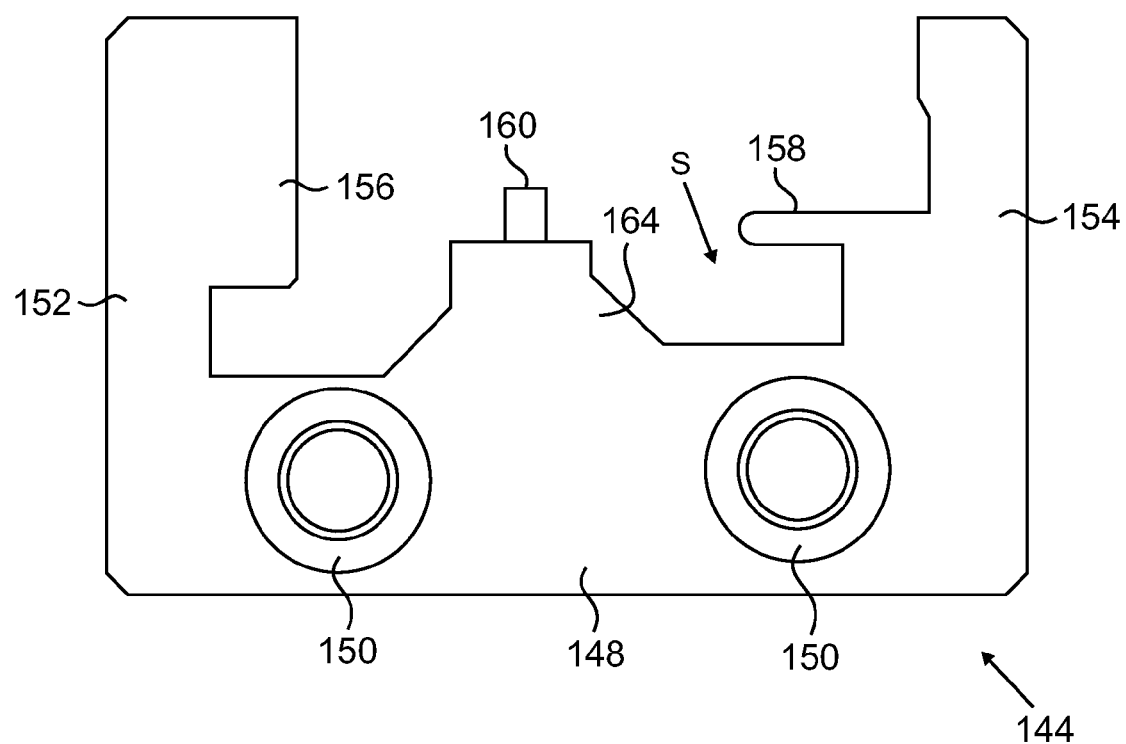
FIG. 6 is a top view of a mounting block of a second embodiment of the fixture assembly.
Figure 7:
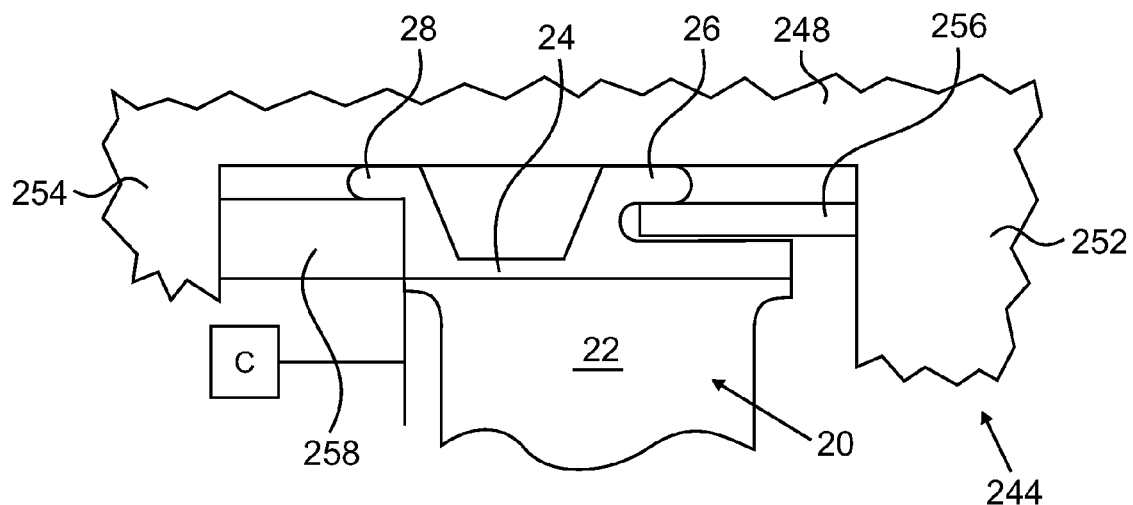
FIG. 7 is a side view of an airfoil engaged with a third embodiment of the fixture assembly according the present invention.
Figure 8:
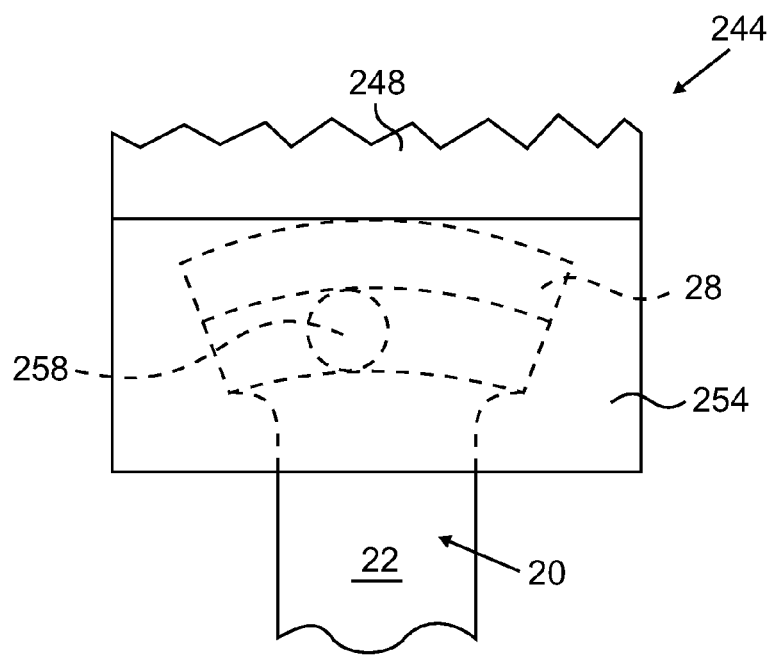
FIG. 8 is a front view of the airfoil engaged with the third embodiment of the fixture assembly.

FIG. 6 is a top view of a second embodiment of a mounting block 144 for the fixture assembly 40. The configuration of the mounting block 144, with a base portion 148, openings 150 and first and second lateral portions 152 and 154, is generally similar to those described above with respect to the mounting block 44, with similar subcomponents designated in FIG. 6 by similar reference numbers with numerical values increased by one hundred. However, the mounting block 144 further includes a protrusion 164 extending from the base portion 148 in which the biased retaining pin 160 extends. The first and second retaining structures 156 and 158 are also positioned relatively close to the base portion 148. In the illustrated embodiment, engagement surfaces of the first and second retaining structures 156 and 158 can be planar or arcuate. For example, the second retaining structure 158 can have a cylindrical shape, which a pivot axis arranged coaxially with the cylindrical second retaining structure 158. Furthermore, the second lateral portion 154 can extend past the second retaining structure 158, such that second retaining structure 158 is positioned within the slot S. FIG. 7 is a side view of the airfoil 20 (having first and second feet 26 and 28) engaged with a third embodiment of a mounting block 244, and FIG. 8 is a front view of the airfoil 20 engaged with the mounting block 244. The configuration of the mounting block 244, having a base portion 248 with first and second lateral portions 252 and 254 extending therefrom, is generally similar to those described above with respect to the mounting block 144, with similar subcomponents designated in FIGS. 7 and 8 by similar reference numbers with numerical values increased by one hundred. However, the mounting block 244 omits the retaining pin, and the first and second retaining structures 256 and 258 are both formed as cylinders. As shown in FIG. 7, a distal end of the second retaining structure 258 abuts the datum C of the airfoil 20. As shown in FIG. 8, the second retaining structure 258 contacts a middle portion of the second foot 28 of the airfoil 20.

Although the exemplary embodiments have been described, workers skilled in the art will recognize that changes may be made in form and detail without departing from the spirit and scope of the invention. For instance, the particular configuration of the fixture assembly can vary to accommodate particular airfoil workpieces desired to be engaged thereto.

The invention claimed is:

1. A fixture assembly for retaining a workpiece during a coining process, wherein the workpiece includes an airfoil portion, a platform, and feet extending from the platform opposite the airfoil portion, the feet configured to engage a retention slot in a gas turbine engine, wherein each one of the feet defines a substantially arcuate engagement surface, the assembly comprising: a workpiece that includes an airfoil portion, a platform, and feet extending from the platform opposite the airfoil portion, wherein each one of the feet defines a substantially arcuate engagement surface; a mounting block for releasably engaging the feet, wherein the mounting block comprises: a first portion defining opposite first and second lateral edges; a slot defined in the first portion between the first and second lateral edges and having an exposed front face to provide access to the slot; and first and second retaining structures positioned adjacent to the first and second lateral edges, respectively, of the first portion, wherein each of the first and second retaining structures overhangs the slot and defines an engagement surface facing the slot, such that during engagement of the workpiece the substantially arcuate engagement surfaces of the feet contact the engagement surfaces of the first and second retaining structures to provide a pivotable engagement.

2. The assembly of claim 1 and further comprising: a first portion of a coining die fixed adjacent to the mounting block to engage the airfoil portion of the workpiece during the coining process, wherein the engagement of the mounting block to the workpiece permits pivotal movement of the workpiece relative to the first portion of the coining die between pre-coining and post-coining positions.

3. The assembly of claim 2, wherein the first portion of the coining die is positioned substantially horizontally, and wherein the mounting block has a non-horizontal orientation.

4. The assembly of claim 1, wherein the engagement surfaces of the first and second retaining structures are each substantially planar.

5. The assembly of claim 1, the mounting block further comprising: attachment structures for removably securing the mounting block to a base, wherein the attachment structures comprise fasteners secured to the first portion of the mounting block.

6. The assembly of claim 1 and further comprising: a biased retaining pin extending from the first portion of the mounting block through at least a portion of the slot for biasing the workpiece relative to the first and second retaining structures.

7. The assembly of claim 6, wherein the biased retaining pin is oriented substantially perpendicular to the planar surface of the first retaining structure, and is configured to contact the workpiece at a face of the platform opposite the airfoil portion.

8. A fixture assembly for retaining a workpiece, wherein the workpiece includes an airfoil portion, a platform, and feet extending from the platform opposite the airfoil configured to engage a retention slot in a gas turbine engine, wherein each one of the feet defines a substantially arcuate engagement surface, the assembly comprising: a workpiece that includes an airfoil portion, a platform, and feet extending from the platform opposite the airfoil, wherein each one of the feet defines a substantially arcuate engagement surface;
a first mounting surface configured to engage a first foot of the workpiece at the respective substantially arcuate engagement surface; a second mounting surface configured to engage a second foot of the workpiece at the respective substantially arcuate engagement surface; a third substantially planar mounting surface positioned adjacent to both the first and second mounting surfaces and configured to contact both first and second feet of the workpiece, wherein the first and third mounting surfaces can maintain engagement with respect to two datum surfaces at the feet of the workpiece while allowing pivoting movement of the workpiece.

9. The assembly of claim 8, wherein the first and second mounting surfaces are each cylindrical.

* * * * *

UNITED STATES PATENT AND TRADEMARK OFFICE
CERTIFICATE OF CORRECTION

PATENT NO. : 8,490,956 B2  
APPLICATION NO. : 12/547087  
DATED : July 23, 2013  
INVENTOR(S) : Nathan D. Korn and Mohamed Salleh Najib Page 1 of 1

It is certified that error appears in the above-identified patent and that said Letters Patent is hereby corrected as shown below:

In the Claims

Col. 5, Lines 29-35, Claim 1
Delete "for retaining a workpiece during a coining process, wherein the workpiece includes an airfoil portion, a platform, and feet extending from the platform opposite the airfoil portion, the feet configured to engage a retention slot in a gas turbine engine, wherein each one of the feet defines a substantially arcuate engagement surface, the assembly"

Col. 6, Lines 28-33, Claim 8
Delete "for retaining a workpiece, wherein the workpiece includes an airfoil portion, a platform, and feet extending from the platform opposite the airfoil configured to engage a retention slot in a gas turbine engine, wherein each one of the feet defines a substantially arcuate engagement surface, the assembly"

Signed and Sealed this
Eighteenth Day of March, 2014

Michelle K. Lee
*Deputy Director of the United States Patent and Trademark Office*